(12) United States Patent
Wiley

(10) Patent No.: US 6,263,930 B1
(45) Date of Patent: Jul. 24, 2001

(54) STUMP GRINDER

(76) Inventor: Scott A. Wiley, 25657 Hill and Dale, Splendora, TX (US) 77372

( * ) Notice: Subject to any disclaimer, the term of this patent is extended or adjusted under 35 U.S.C. 154(b) by 0 days.

(21) Appl. No.: 09/546,579

(22) Filed: Apr. 11, 2000

(51) Int. Cl.$^7$ .................................................. A01G 23/06

(52) U.S. Cl. ...................................... 144/24.12; 144/334

(58) Field of Search ........................... 37/302; 144/24.12, 144/208.1, 208.4, 208.5, 208.6, 218, 241, 334, 231, 236

(56) References Cited

U.S. PATENT DOCUMENTS

| | | |
|---|---|---|
| 3,044,509 | 7/1962 | Kehler . |
| 3,732,905 | 5/1973 | Pickel . |
| 4,530,385 | 7/1985 | York . |
| 4,621,668 | 11/1986 | York . |
| 4,681,145 | 7/1987 | York . |
| 5,435,359 | 7/1995 | Craft . |
| 5,655,581 | 8/1997 | Craft . |
| 5,829,497 | 11/1998 | Maroney . |
| 5,996,657 | * 12/1999 | Riesselman ........................... 144/334 |

FOREIGN PATENT DOCUMENTS 1240388    6/1986   (RU) .

* cited by examiner

Primary Examiner—W. Donald Bray
(74) Attorney, Agent, or Firm—Richard C. Litman

(57) ABSTRACT

A stump grinder including a frame, a drive shaft, a gearbox, a rotatable shaft, a grinding drum, and a shroud cover. The frame extends longitudinally and supports at its free end a transversely mounted rotatable shaft upon which is mounted a grinding drum. One end of the rotatable shaft is rotatably mounted in the frame, and the other end of the rotatable shaft is rotatably connected to a gearbox. The gearbox is driven by the drive shaft which is configured for coupling to the power take off shaft of a conventional tractor. The opposite end of the frame includes a plurality of fastening means for securely fastening the frame to the tractor. The grinding drum is designed so that its upper circumference rotates away from the tractor and thus away from the operator so that any loose debris is thrust outwardly from the operator. Grinding drum power is achieved through the tractor itself. The shroud covering covers the upper portion of the grinding drum in the interests of operator safety. A deflection plate is attached to the shroud covering for further operator protection. The stump grinder has a three point lift hook-up that allows it to be changed out in less than five minutes.

16 Claims, 3 Drawing Sheets

STUMP GRINDER

BACKGROUND OF THE INVENTION

1. Field of the Invention

The present invention relates to a mechanical device used to grind down tree stumps.

2. Description of the Related Art

In land clearing operations, there is frequently a need to remove stumps after trees have been cut. Many methods and devices have been proposed for removing stumps from the earth's surface in order to allow soil tillage, building construction, etc. The related art is represented by the following patents of interest.

U.S. Pat. No. 3,044,509, issued on Jul. 17, 1962 to Jacob Keller, describes a horizontally rotating stump cutting cylinder universally mounted upon the rear end of a tractor. Keller does not suggest a stump grinder according to the claimed invention.

U.S. Pat. No. 3,732,905, issued on May 15, 1973 to James M. Pickel, describes a tree stump removing apparatus for mounting on a prime mover and operative to move a vertical cutting blade laterally during the cutting action thereof. Pickel does not suggest a stump grinder according to the claimed invention.

U.S. Pat. No. 4,530,385, issued on Jul. 23, 1985 to Norman N. York, describes a tree stump removal apparatus which is supported by the standard three point hitch of a tractor and is driven by the power take-off and hydraulic supply systems of the tractor. York '385 does not suggest a stump grinder according to the claimed invention.

U.S. Pat. No. 4,621,668, issued on Nov. 11, 1998 to Norman N. York, describes a tree stump removal apparatus which is supported by the standard three point hitch of a tractor and is driven by the power take-off and hydraulic supply systems of the tractor. York '668 does not suggest a stump grinder according to the claimed invention.

U.S. Pat. No. 4,681,145, issued on Jul. 21, 1987 to Norman N. York, describes a tree stump removal apparatus which is supported by the standard three point hitch of a tractor and is driven by the tractor power take-off, but incorporates a hydraulic supply system which is independent of the tractor hydraulic system. York '145 does not suggest a stump grinder according to the claimed invention.

U.S. Pat. No. 5,435,359, issued on Jul. 25, 1995 to Robert J. Craft, describes a stump grinder having a cutting wheel with peripherally mounted cutter teeth. Craft '359 does not suggest a stump grinder according to the claimed invention.

U.S. Pat. No. 5,655,581, issued on Aug. 12, 1997 to Robert J. Craft, describes a stump grinder attachment capable of being mounted on a three-point hitch of a tractor. Craft '581 does not suggest a stump grinder according to the claimed invention.

U.S. Pat. No. 5,829,497, issued on Nov. 3, 1998 to Freeman D. Muroney, describes a stump grinder designed for attachment to the three point hitch of an agricultural tractor with a stump grinding wheel driven by the tractor power takeoff. Muroney does not suggest a stump grinder according to the claimed invention.

Soviet Union Pat. document 1,240,388, published on Jun. 30, 1986, shows a tree-stump cutting machine. Soviet Union '388 does not suggest a stump grinder according to the claimed invention.

None of the above inventions and patents, taken either singularly or in combination, is seen to describe the instant invention as claimed.

SUMMARY OF THE INVENTION

The present invention is a stump grinder. The stump grinder is configured in the form of a demountable attachment for a conventional tractor. Such a conventional tractor typically includes a power take off shaft extending rearwardly from a vertical wall of the tractor. The power take off shaft provides power to the drive shaft of a trailing implement which is coupled to the power take off shaft by a universal joint. A conventional tractor may also be equipped with a three point hitch positioned above the power take off shaft for connection to a linkage of the trailing implement. The hitch is typically secured for vertical pivotable adjustment to accommodate the height of the particular trailing implement.

The stump grinder includes a frame, a drive shaft, a gearbox, a rotatable shaft, and a grinding drum. The stump grinder preferably also includes a shroud cover. The frame extends longitudinally and supports at its free end a transversely mounted rotatable shaft upon which is mounted a grinding drum. One end of the rotatable shaft is rotatably mounted in the frame, and the other end of the rotatable shaft is rotatably connected to a gearbox. The gearbox is driven by the drive shaft which is configured for coupling to the power take off shaft of a tractor. The opposite end of the frame includes a plurality of fastening means for securely fastening the frame to a tractor. The grinding drum is designed so that its upper circumference rotates away from the tractor and thus away from the operator so that any loose debris is thrust outwardly from the operator. Grinding drum power is achieved through the tractor itself. The shroud covering covers the upper portion of the grinding drum in the interests of operator safety. A deflection plate is attached to the shroud covering for further operator protection. The stump grinder has a three point lift hook-up that allows it to be changed out in less than five minutes.

The power take off shaft of the tractor is coupled to the drive shaft of the stump grinder. The drive shaft is rotatably coupled via a slip-clutch to the gearbox of the stump grinder. The gearbox drives the grinding drum directly. This enables the stump grinder to work even when it rains. The stump grinder is preferably configured for 90 horse power. The stump grinder works by using torque-thrust thus using less fuel.

The grinding drum has a stump abrading surface which contains numerous teeth in a staggered pattern covering the operating width of the grinding drum. The grinding drum comprises a one inch thick hollow steel drum having a cylindrical outer surface studded with removable stump abrading teeth. The teeth, approximately 1.5" tall, are bolted onto the grinding drum in holes in the outer surface. A number of depth gauges, preferably four, are mounted on the grinding drum and function to prevent the teeth from biting too aggressively into a tree stump to result in ¼" slivers. The depth gauges on the grinder drum are easy to replace when worn, because of a special cutter layout on the grinder drum.

The outer surface of the grinding drum includes means for releasably mounting the removable teeth. Such means comprise weld on bases that are welded onto the outer surface of the grinding drum. The removable tooth are each bolted and secured to a weld on base with lock bolts. Such weld on bases and removable teeth are commonly used in mining and tunneling equipment to bore through rock surfaces. An advantage of using weld on bases and removable teeth results not only from the ability to quickly repair broken teeth but in the ability to change the teeth depending on the preference of the user. For example, wood shredding teeth, wood chipping teeth, scrapping teeth or other configurations may be used individually or in combination depending on the preferences of the user. Since roots often grow around rocks, use of rock boring teeth, such as used in mining applications may be used as well. Such teeth are typically made of hard, wear-resistant material, usually a refractory material such as cemented carbides. The stump grinder is configured for grinding up to 40" tall and 26" deep on almost any terrain. It takes a matter of minutes to grind a 32" diameter wood stump 12" deep.

In order to utilize the stump grinder, an operator attaches the stump grinder to the power take off shaft of a tractor. The operator then positions himself in the seat of the tractor and drives the stump grinder to a subject stump. Thereafter, the operator lowers the grinding drum until the shroud covering is positioned just above the stump. The operator then lowers the grinding drum onto the stump until the grinding drum engages the stump. The operator continues grinding until the stump is eradicated.

Accordingly, it is a principal object of the invention to provide a stump grinder that is directly driven via a gear box.

It is another object of the invention to provide a stump grinder which includes a shroud covering.

It is a further object of the invention to provide a stump grinder which can be rapidly attached or disengaged with a conventional power take off shaft of a conventional tractor.

It is an object of the invention to provide improved elements and arrangements thereof in a stump grinder for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
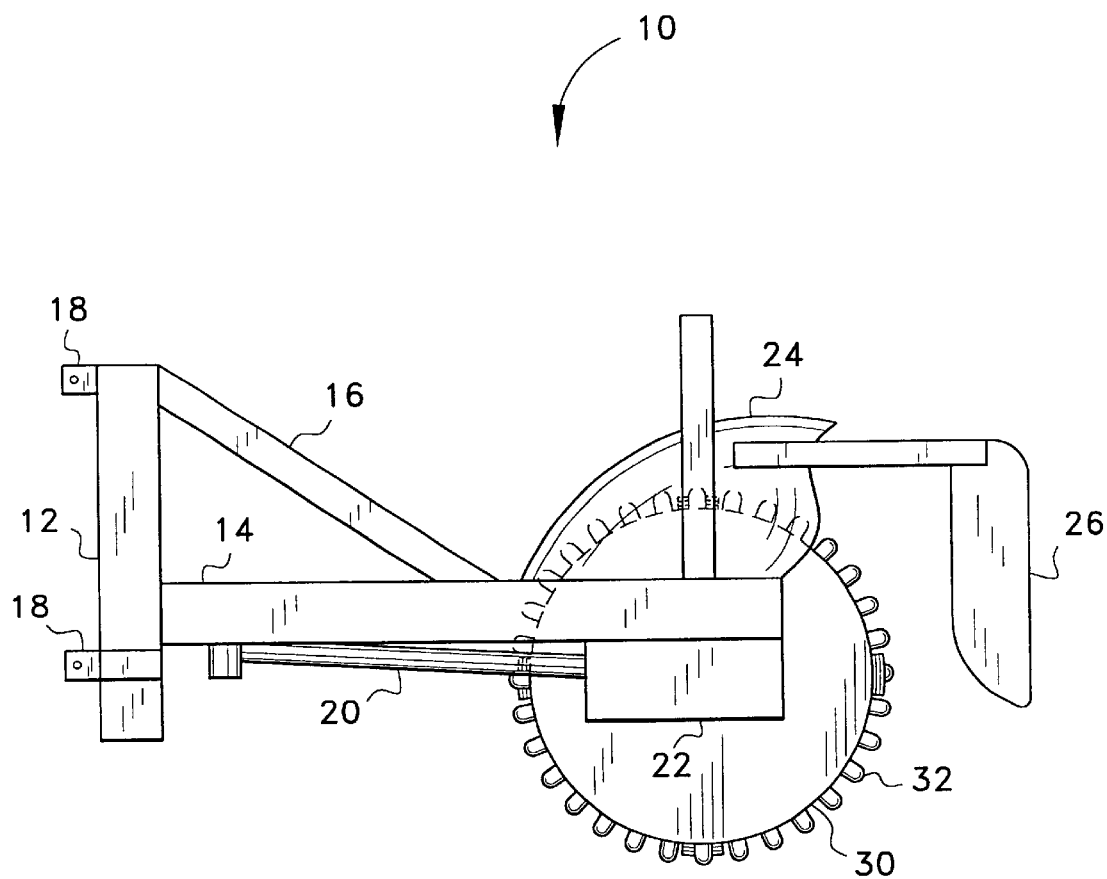
FIG. 1 is a left side view of a stump grinder according to the present invention.

The present invention is a stump grinder. The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

Figure 2:
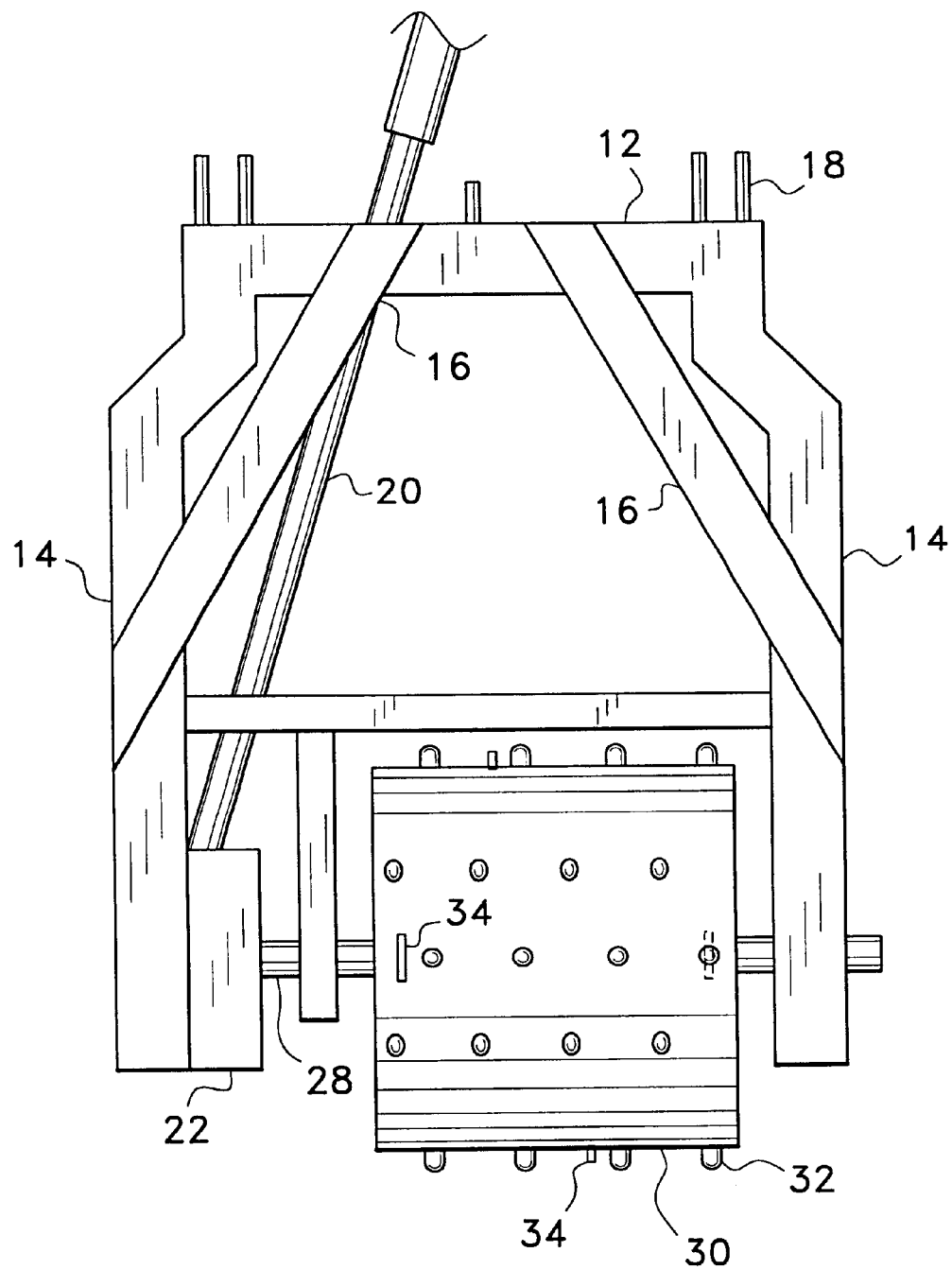
FIG. 2 is a top view of a stump grinder according to the present invention without a cover.
Figure 3:
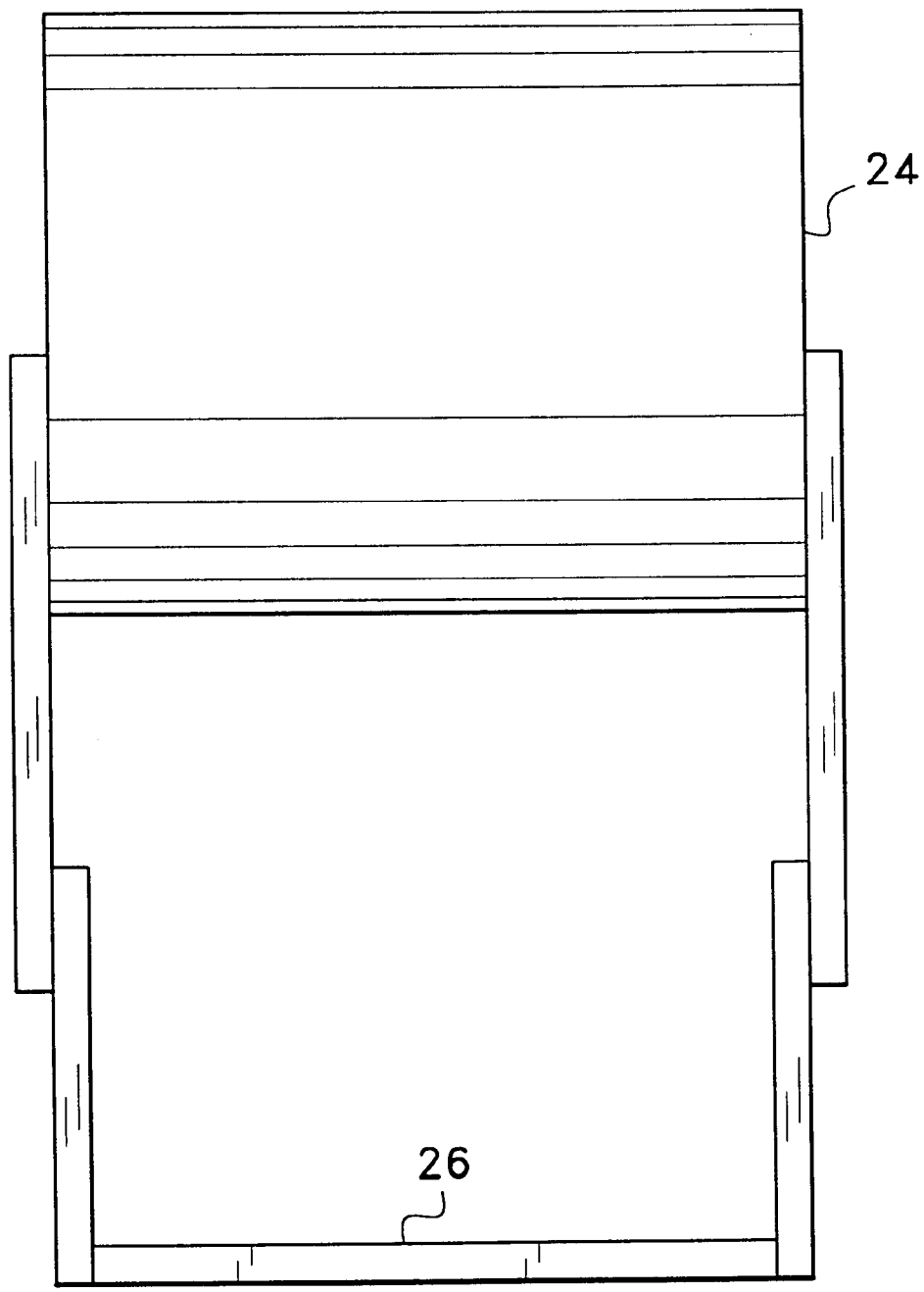
FIG. 3 is a top view of a cover of a stump grinder according to the present invention.

Referring now to FIGS. 1 through 3, the stump grinder 10 is configured in the form of a demountable attachment for a conventional tractor (not shown). Such a conventional tractor typically includes a power take off shaft extending rearwardly from a vertical wall of the tractor. The power take off shaft provides power to the drive shaft of a trailing implement which is coupled to the power take off shaft by a universal joint. A conventional tractor may also be equipped with a three point hitch positioned above the power take off shaft for connection to a linkage of the trailing implement. The hitch is typically secured for vertical pivotable adjustment to accommodate the height of the particular trailing implement.

The stump grinder 10 includes a frame 12, a drive shaft 20, a gearbox 22, a rotatable shaft 28, and a grinding drum 30. The stump grinder 10 may also include a shroud cover 24. The frame 12 extends longitudinally and supports at its free end a transversely mounted rotatable shaft 28 upon which is mounted the grinding drum 30. One end of the rotatable shaft 28 is rotatably mounted in the frame, and the other end of the rotatable shaft 28 is rotatably connected to the gearbox 22. The gearbox 22 is driven by the drive shaft 20 which is configured for coupling to the power take off shaft of a tractor. The opposite end of the frame 12 includes a plurality of fastening means 18 for securely fastening the frame to a tractor. The grinding drum 30 is designed so that its upper circumference rotates away from the tractor and thus away from the operator so that any loose debris is thrust outwardly from the operator. Grinding drum power is achieved through the tractor itself. The shroud covering 24 covers the upper portion of the grinding drum 30 in the interests of operator safety. A deflection plate 26 is attached to the shroud covering 24 for further operator protection. The stump grinder 10 has a three point lift hook-up that allows it to be changed out in less than five minutes.

The power take off shaft of the tractor is coupled to the drive shaft 20 of the stump grinder 10. The drive shaft 20 is rotatably coupled via a slip-clutch to the gearbox 22 of the stump grinder 10. The gearbox 22 drives the grinding drum 30 directly. This enables the stump grinder 10 to work even when it rains. The stump grinder 10 is configured for 90 horse power. The stump grinder 10 works by using torque-thrust thus using less fuel.

The grinding drum 30 has a stump abrading surface which contains numerous teeth 32 in a staggered pattern covering the operating width of the grinding drum 30. The grinding drum 30 comprises a one inch thick hollow steel drum having a cylindrical outer drum wall studded with removable stump abrading teeth 32. The teeth 32, approximately 1.5" tall, are bolted onto the grinding drum 30 in holes in the outer surface. A number of depth gauges 34, preferably four, are mounted on the grinding drum 30 and function to prevent the teeth 32 from biting too aggressively into a tree stump to result in ¼" slivers. The depth gauges 34 on the grinder drum 30 are easy to replace when worn, because of a special cutter layout on the grinder drum 30.

The surface of the grinding drum 30 includes means for releasably mounting the removable teeth 32. Such means comprise weld on bases that are welded onto the outer surface of the grinding drum 30. The removable tooth 32 are each bolted and secured to a weld on base with lock bolts. Such weld on bases and removable teeth are commonly used in mining and tunneling equipment to bore through rock surfaces. An advantage of using weld on bases and removable teeth results not only from the ability to quickly repair broken teeth but in the ability to change the teeth depending on the preference of the user. For example, wood shredding teeth, wood chipping teeth, scrapping teeth or other configurations may be used individually or in combination depending on the preferences of the user. Since roots often grow around rocks, use of rock boring teeth, such as used in mining applications may be used as well. Such teeth are typically made of hard, wear-resistant material, usually a refractory material such as cemented carbides. The stump grinder 10 is configured for grinding up to 40" tall and 26" deep on almost any terrain. It takes a matter of minutes to grind a 32" diameter wood stump 12" deep.

In order to utilize the stump grinder 10, an operator attaches the stump grinder 10 to the power take off shaft of a tractor. The operator then positions himself in the seat of the tractor and drives the stump grinder 10 to a subject stump. Thereafter, the operator lowers the grinding drum 30 until the shroud covering 24 is positioned just above the stump. The operator then lowers the grinding drum 30 onto the stump until the grinding drum 30 engages the stump. The operator continues grinding until the stump is eradicated.

It is to be understood that the present invention is not limited to the embodiments described above, but encompasses any and all embodiments within the scope of the following claims.

I claim:

1. A stump grinder for a self-propelled vehicle, said stump grinder comprising:
   a frame;
   a grind drum assembly mounted on the frame that has a grinding drum rotatably attached thereto, wherein said grinding drum comprises a cylinder having an outer surface;
   at least one removable tooth removably mounted on the outer surface of said grinding drum;
   at least one depth gauge mounted on the outer surface of said grinding drum; and,
   drive means for rotating of said grinding drum.

2. The stump grinder according to claim 1, wherein said cylinder is about a one inch thick hollow steel drum.

3. The stump grinder according to claim 1, wherein said at least one removable tooth is about 1.5 inches tall.

4. The stump grinder according to claim 1, wherein said at least one depth gauges is four depth gauge rings.

5. The stump grinder according to claim 1, wherein said drive means comprises a drive shaft and a gearbox.

6. The stump grinder according to claim 1, further comprising a shroud covering carried by said frame and surrounding top and side portions of said grinding drum; said shroud covering having first and second opposite side walls positioned adjacent to opposite faces of said grinding drum.

7. The stump grinder machine according to claim 6, wherein said shroud covering comprises a deflection plate attached thereto.

8. The stump grinder according to claim 1, further comprising a three point lift hook-up.

9. A stump grinder machine comprising:
   a self-propelled vehicle including a base;
   a frame;
   a grind drum assembly mounted on the frame that has a grinding drum rotatably attached thereto, wherein said grinding drum comprises a cylinder having an outer surface;
   at least one removable tooth removably mounted on the outer surface of said grinding drum;
   at least one depth gauge mounted on the outer layer of said grinding drum; and,
   drive means for rotating of said grinding drum.

10. The stump grinder according to claim 9, wherein said cylinder is about a one inch thick hollow steel drum.

11. The stump grinder according to claim 9, wherein said at least one removable tooth is about 1.5 inches tall.

12. The stump grinder according to claim 9, wherein said at least one depth gauge is four depth gauges.

13. The stump grinder machine according to claim 9, wherein said drive means comprises a drive shaft and a gearbox.

14. The stump grinder machine according to claim 9, further comprising a shroud covering carried by said frame and surrounding top and side portions of said grinding drum; said shroud covering having first and second opposite side walls positioned adjacent to opposite faces of said grinding drum.

15. The stump grinder machine according to claim 14, wherein said shroud covering comprises a deflection plate attached thereto.

16. The stump grinder according to claim 9, further comprising a three point lift hook-up.

* * * * *